Sept. 4, 1923.
G. V. RODRIGUEZ
1,467,013
APPARATUS FOR HOISTING AND TRANSFERRING SUGAR CANE AND OTHER ARTICLES
Filed Sept. 21, 1920
4 Sheets-Sheet 1
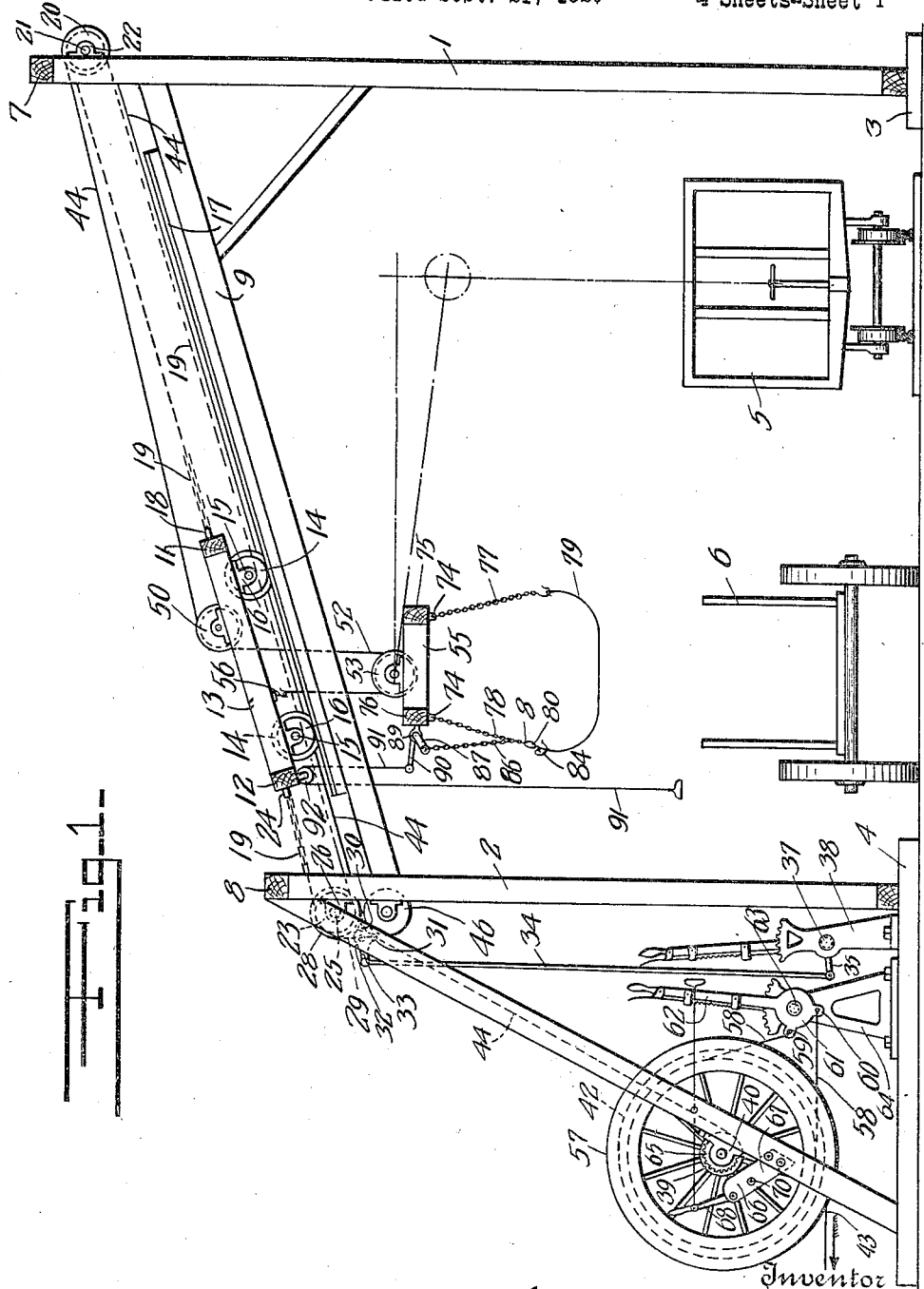
Inventor
German Viera Rodriguez
By his Attorney
Wm Wallace White

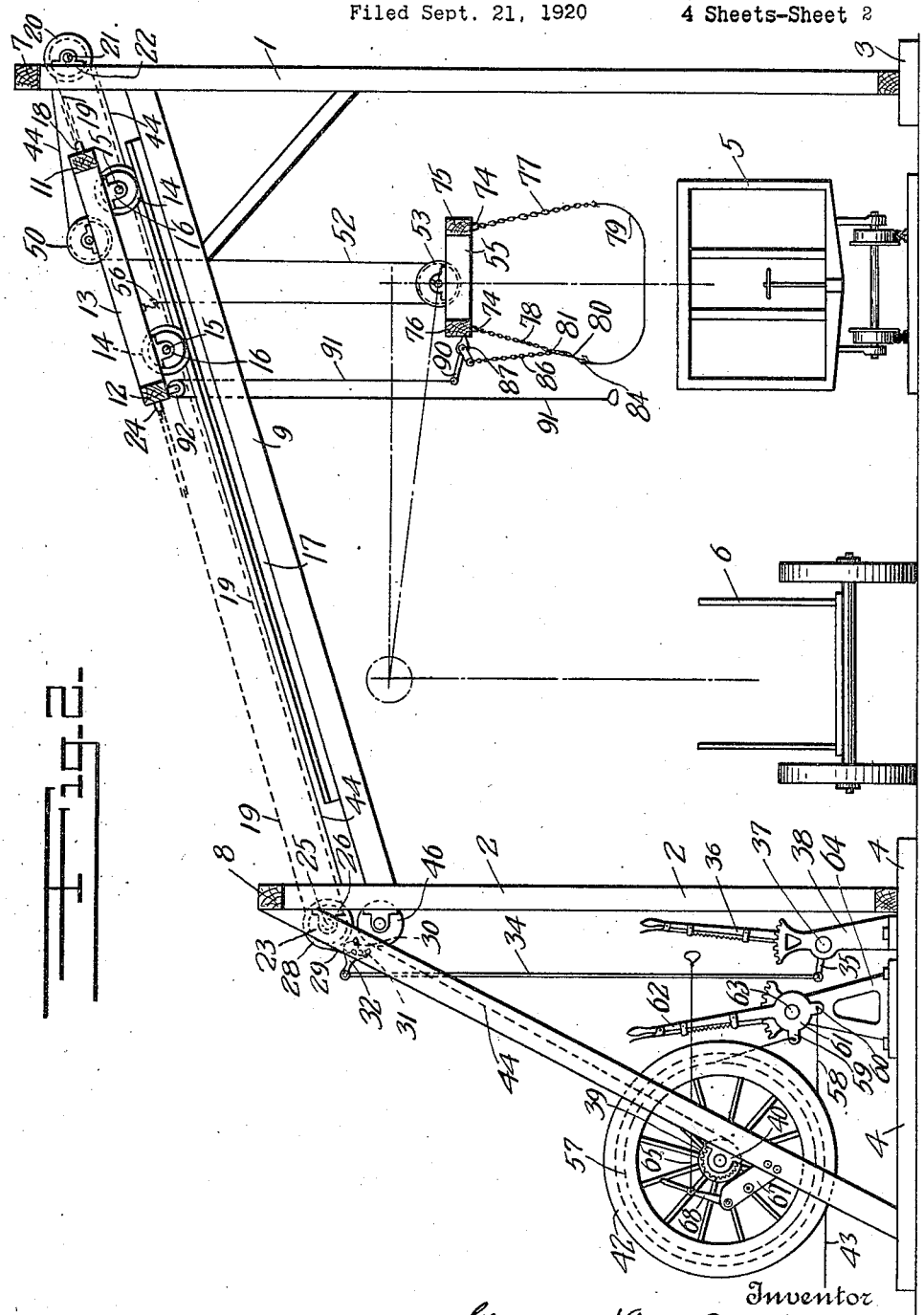

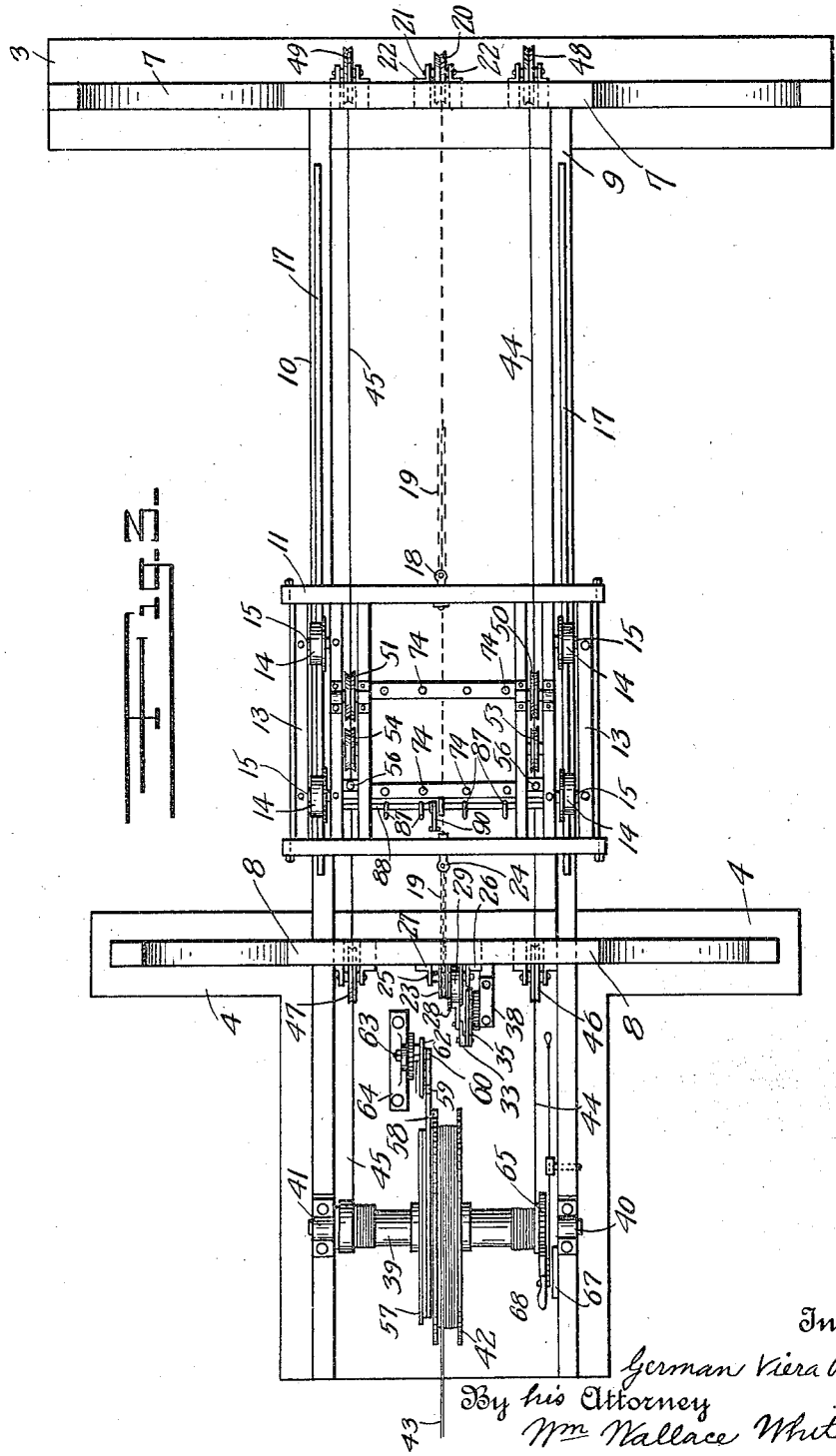

Sept. 4, 1923.  
G. V. RODRIGUEZ  
1,467,013  
APPARATUS FOR HOISTING AND TRANSFERRING SUGAR CANE AND OTHER ARTICLES  
Filed Sept. 21, 1920  
4 Sheets-Sheet 4
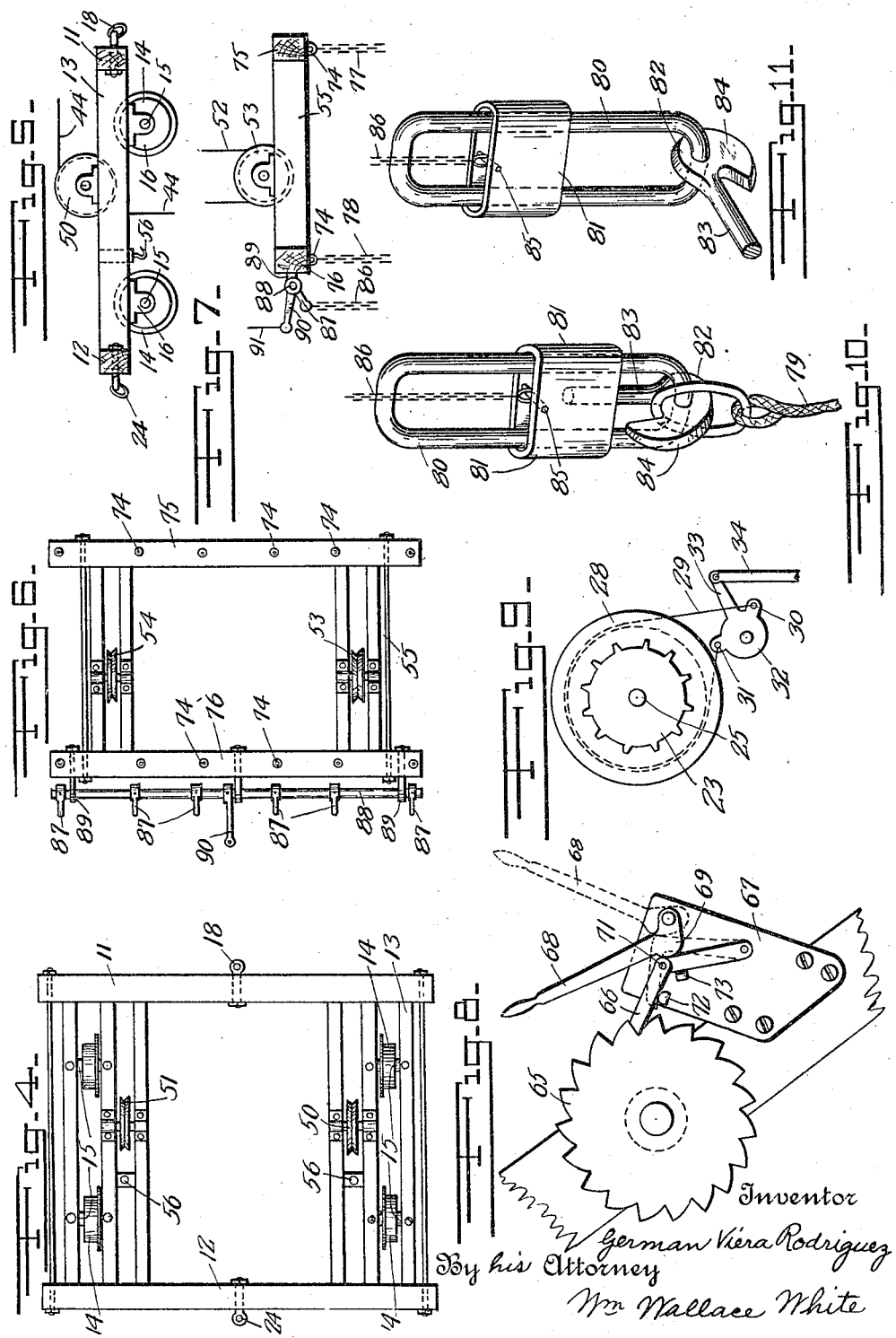

Patented Sept. 4, 1923.

1,467,013

UNITED STATES PATENT OFFICE.

GERMAN VIERA RODRIGUEZ, OF MANZANILLO, CUBA.

APPARATUS FOR HOISTING AND TRANSFERRING SUGAR CANE AND OTHER ARTICLES.

Application filed September 21, 1920. Serial No. 411,771.

*To all whom it may concern:*

Be it known that I, GERMAN VIERA RODRIGUEZ, a subject of the King of Spain, residing at Manzanillo, Republic of Cuba, have invented new and useful Improvements in Apparatus for Hoisting and Transferring Sugar Cane and Other Articles, of which the following is a specification.

This invention relates to improvements in load-transferring apparatus, the object of the invention being to provide an improved apparatus for hoisting and transferring sugar cane and other articles.

The principal object of the invention is to provide an improved apparatus of this class which is less expensive than those at present in use, which is simpler in its operation and very efficient.

A further object of the invention is to provide an apparatus in which the use of power for transporting the elevating car is eliminated, this operation being done automatically by a system of pulleys conveniently disposed and actuated by the weight of the car or by the weight of the load.

Another object of the invention is to provide means for stopping the transporting car and retaining the same in position when loading or unloading.

With these and other objects in view, the invention consists in certain novel details of construction, combination and arrangement of parts hereinafter fully described and illustrated in the accompanying drawings, in which:

Figure 1 is a side elevation of an apparatus embodying my invention, in which the transporting car is illustrated in the position adapted for loading and hoisting;

Fig. 2 is a side elevation showing the car at the time of discharging its load;

Fig. 3 is a top plan view of the hoisting apparatus;

Fig. 4 is a detail in top plan view of the construction of the transporting car;

Fig. 5 shows a detail of said car in side elevation, on an enlarged scale;

Fig. 6 is a top plan view of the carrier employed for hoisting the load;

Fig. 7 is a detail of said carrier in side elevation, on an enlarged scale;

Fig. 8 is a detail of the mechanism employed to stop the raising movement of the load and maintaining it in suspension in the desired place;

Fig. 9 is a detail view of the friction mechanism which serves as a brake for the control of the transporting car and for maintaining it in position where desired for loading or unloading.

Fig. 10 illustrates, on an enlarged scale and in closed position, the mechanism employed for discharging the load; and Fig. 11 illustrates said mechanism in position for discharging the load.

Similar characters of reference indicate corresponding parts throughout all figures of the drawings.

The apparatus consists of a framework constituted by the standards 1 and 2 projecting upwardly from the bases 3 and 4 on each side of a railroad track 5 and a road for vehicles 6, in such a manner that both roads are located between said standards. The upper ends of the standards are fastened to the beams 7 and 8 at right angles thereto, and to the transverse beams 9 and 10, which not only serve to secure the standards to each other, but at the same time serve the purpose of supporting or holding the transporting car. Said car consists of a framework formed by the beams 11 and 12, and a pair of transverse beams 13, and four flanged wheels 14 mounted on a shaft 15, which turns freely on bearings 16. These wheels run freely upon the rails 17, which rails are firmly fastened to the beams 9 and 10 and form a track for the car. The beams 9 and 10 are disposed in an inclined position, having the highest end on the side nearest the railroad, so that the transporting car, after discharging the load into the railroad cars, may automatically return from the highest to the lowest point of the frame in order to place itself over the vehicle which it is desired to unload, and again ascending in the manner hereinafter described.

All of these movements of the transporting car are controlled by the operator of the apparatus from below, the following mechanism being provided therefor.

In the central part of the beam 11 an eye-bolt 18 is provided which is connected to the end of a chain 19, which passes over a grooved pulley 20 mounted on a shaft 21, freely rotating on pedestals 22 fixed on the highest end of the framework. This chain extends underneath the car and engages a sprocket wheel 23, see Fig. 3, being connected at the other end 12 of the car to another eye-bolt 24, thereby forming a system of endless chain. The sprocket wheel 23 is fixed to a shaft 25 freely rotating on the supports or pedestals 26, 27, and upon said shaft a pulley 28 is also fixed. Surrounding the ring of the said pulley, a steel band 29 is disposed, the ends thereof engaging the projections 30, 31, of a disc plate 32, which plate is provided with a projecting arm 33 connected by means of the rod 34 to an arm 35 of the lever 36, which is fulcrumed at 37 on a plate 38, which serves to support the same.

The described mechanism acts as a friction brake in order to maintain the transporting car at any desired point on the frame.

When the lever 36 is placed in the position shown in Fig. 1, the arm 35 assumes its lowermost position, exerting a downward pull on the rod 34 as well as on the arm 33, so that the disc 32 turns in the direction indicated by the arrow. This movement has a tendency to tighten the band 29 around the pulley 28, stopping it and therefore maintaining steadily the transporting car. When the lever 36 is placed as shown in Fig. 2, the position of all members is reversed, the band 29 being loosened, leaving the pulley 28 free to rotate and to effect the movement of the car.

The mechanism for raising the load is similar to those generally employed for this purpose, except that it has the improved friction brake above described, and mechanism for controlling the operation of lifting the load.

The elevating mechanism comprises a shaft 39 which revolves on the bearings 40, 41, and to said shaft is attached a drum 42 on which the cable 43 is wound, one end of said cable being connected to a suitable motor or the like. There are also connected to said shaft the ends of the cables 44, 45, which pass over the pulleys 46 and 47, extending under the transporting car surrounding the pulleys 48, 49, running upon the pulleys 50, 51, mounted on the car, and descending in order to form the loops 52, which pass around the pulleys 53, 54, disposed on the carrier 55, and being fastened to the eye-bolts 56 fixed in the lower part of the transporting car.

When the cable 43 is hauled, it unwinds from the drum, giving it a rotary movement which is transmitted to the shaft 39, the cables 44, 45, being wound around said shaft, and continue to raise up the carrier 55, together with the load therein, and consequently when the movements are reversed, the cables 44, 45, are unwound, and the cable 43 is then wound, causing the carrier to descend.

In order to govern these movements, the friction brake and control mechanism above mentioned are provided.

The friction brake comprises a pulley 57, (see Fig. 3), secured to the shaft 39, the pulley being surrounded by a steel band 58 the ends of which are joined to the projections 59, 60, of a disc plate 61, connected to the lever 62, and which may oscillate upon a shaft 63 mounted on a pedestal 64 firmly secured to the base 4 of the framework.

From Figs. 1 and 2 the manner of operation of the brake will readily be seen. In Fig. 1, with the lever thrown towards the right, the brake is loosened, and the drum and elevating mechanism are therefore free to rotate, being the position for loading. In Fig. 2 with the lever thrown towards the left, the brake is held tight, preventing movement of said elevating mechanism, and thus maintaining the apparatus free from movement, which is the position adopted while the transporting operation of the load is effected.

The control mechanism comprises a toothed wheel 65 firmly attached to the shaft 39, and a pawl 66 engaging with the wheel. The pawl 66 is mounted upon a plate or support 67 and acts by means of a lever 68 provided with a cam 69, and is formed of two arms, one of them mounted in such a manner that it may oscillate upon a stud 70 fixed on the plate or support 67, and is also articulated at 71 to the other arm which may engage or disengage the toothed wheel under the action of the cam 69 and lever 68, the movements of said arms being limited by the stoppers 72, 73, projecting from the support 67.

When the mechanism is in operation in order to impede the movement of the elevating mechanism, the lever 68, arm 69 and pawl 66 are in the position indicated by full lines in Fig. 8, and both arms of the pawls rest against the stoppers 72, 73; but by maintaining the lever 68 and the cam 69 in the position indicated by dotted lines in said figure, the weight of the load, which has the tendency to unwind the cables 44 and 45, causes the toothed wheel 65 to rotate, thus forcing the pawl to disengage said wheel and assuming the position represented by dotted lines in Fig. 8 and leaving the elevating mechanism free to be moved and operated.

The elevating carrier is provided with a plurality of eye-bolts 74 in its beams 75, 76, from which the chains 77, 78, pend in order to hoist the load in the usual manner by means of the slings 79.

The ends of the chains 77, 78, are provided with bolt-hooks in order to receive the slings. The bolt-hooks corresponding to the chains 77 are fixed at the end thereof and those corresponding to the chains 78 form a means for unhooking the slings 79 at the moment when the carrier is to be unloaded, as illustrated in Figs. 10 and 11.

This mechanism comprises a link 80 and a hollow piece 81, which surrounds the link and is capable of sliding lengthwise thereof. A bolt-hook 82 is disposed over the lower transverse branch of the link 80 in such a manner that it may oscillate. It is provided with a prolongated straight arm 83, and its object is to enter within the hollow piece 81 in order to maintain the bolt-hook in its hooking or closing position, said bolt-hook 82 having a curved branch 84 in order to hook the slings 79.

The links 80 hang from the chain 78 and the hollow piece 81 is provided with a cross piece 85 which is connected by means of the chains 86 to the arms 87 fixed on a rocking bar 88 conveniently supported on the bearings 89 fixed to the beams 76 of the carrier 55.

In order to unloosen all the slings at the same time, I provide a rocking bar 88, an arm 90 projecting from the rocking bar and a cable 91 connected to the arm 90, which passes over a pulley 92 fixed on the transporting car, and running downward in order to permit the operator to handle it at will. When pull is exerted on the cable 91, the arms 90 ascends, causing the bar to oscillate, and the arms 87 ascend to pull on the chains 78 carrying with them the hollow pieces 81, which slide lengthwise of the link 80 and free the arm 83 of the bolt-hook 82, and then the weight of the load causes it to incline downwardly, the slings 79 becoming unhooked from the curved branch 84 and thus permitting the load to fall.

In the foregoing description of the apparatus, the operation of same has been partially described, but in order to give a more complete explanation of the operation, it may be stated as follows:

Assuming that the load contained in a vehicle or cart is to be transported to a railroad car, and that the transporting car of the apparatus is placed at the opposite end of the vehicle, that is to say, over the railroad car, the operator manipulates the lever 36 in order to unlock the brake located in the upper part of the standards 2 which controls the operation of said transporting car along the track, and the car will descend by gravity until it comes directly over the vehicle, and then the brake is again locked by operation of the same lever 36.

Thereupon the lever 62 is operated to loosen the brake which controls the operation of the drum 42, bringing with it the lever 68 and the cam 69 into the position indicated by dotted lines in Fig. 8, leaving the pawls 66 free from the pressure of said cam 69. The weight of the carrier, secured to the cables 44, 45, causes the shaft 39 to turn and the teeth of the toothed wheel 65 force away the pawl until it is in the position shown by dotted lines in Fig. 8, and thus leaving the elevating mechanism free to act and unwind the cables 44, 45, and permitting the carrier to descend sufficiently to the elevation necessary for hooking the slings 79 on to the chains 77, 78, which pass transversely underneath the load in the usual manner.

The slings once hooked, the lever 68 is returned to its original position, engaging the pawl and the toothed wheel, whereupon the motor is started in order to unwind the cable 43, causing the drum 42 and the shaft 39 to rotate and wind upon said drum the cables 44, 45, and elevating both the carrier and the load.

When the carrier has reached the desired height, the motor is stopped and the friction brake is applied in order to impede the movement of the elevating mechanism. Then the friction brake controlling the transporting car is loosened, in the manner above described, and the weight of the load suspended by the carrier acts on the cables 44, 45 and their respective pulleys, forcing the transporting car to make an ascending movement upon the tracks, there being no necessity whatever for employing any other power, the weight of the load acting directly upon the cables and pulleys. In this manner the car and the load are carried from the cart, as in Fig. 1, retaining it in position over the railroad car, as shown in Fig. 2.

As illustrated in Figs. 1 and 2, it will be seen that the carrier and the load suspended therein, are found in a horizontal plane shown more elevated in Fig. 1 than in Fig. 2. This difference is necessary in order to effect conveniently the discharge of the load, as it diminishes the distance between the load and the railroad car, and is obtained automatically because of the length of the cable, which in the position shown in Fig. 1 extends horizontally between the pulleys 48 and 50 and is converted vertically between the pulleys 50 and 53 as shown in Fig. 2, permitting the automatic arrangement of the load at a convenient height in order to discharge the same without any necessity for making use of the elevating cables 44 and 45, or for employing any other power whatever, as is necessary in the majority of the hoisting apparatuses at present in use.

The difference between the horizontal planes in which the load is placed through this automatic descent varies with the grade of inclination of the track upon which the transporting car runs, with the separation between the vehicle to be unloaded and the one to be loaded, and with the number and arrangements of pulleys employed. In practice I have found that an inclination of from 30° to 35°, and the arrangement of pulleys shown in the drawings, is the most satisfactory in order to obtain the desired result.

It is obvious that various changes and modifications may be made to the details of construction without, however, departing from the spirit or scope of the present invention, and it is not desired to confine the invention to the form herein shown and described.

I claim:

1. In a load transferring apparatus, the combination of a framework, an inclined track disposed at the top of said framework, a car adapted to travel on said track, a grooved pulley secured at one end of said framework and a sprocket wheel disposed at the other end of said framework, a chain passing over said pulley and sprocket wheel and secured to both ends of said car, a shaft on which said sprocket wheel is carried, a pulley also fixed to said shaft, a friction brake for holding said car at any desired position on said track, a carrier suspended from the car, elevating mechanism for raising and lowering said carrier, and means for holding said carrier at any desired position.

2. In a load transferring apparatus, the combination of a framework, an inclined track disposed at the top of said framework, a car adapted to travel on said track, a grooved pulley secured at one end of said framework and a sprocket wheel disposed at the other end of said framework, a chain passing over said pulley and sprocket wheel and secured to both ends of said car, a friction brake for holding said car at any desired position on said track, a carrier suspended from said car, means for elevating said carrier comprising a pair of bearings, a shaft mounted on said bearings, a drum disposed on said shaft, a pair of pulleys at each end of the framework, a pair of pulleys on said car, a pair of pulleys secured to said carrier, cables passing over all of said pulleys, one end of said cables being secured to said shaft and the other end of each of said cables attached to the bottom of said car, a cable having one end secured to said drum and the other end to a motor, a friction brake for holding and releasing said drum, and means for controlling said elevating mechanism comprising a shaft, a toothed wheel secured to said shaft, a pawl adapted to engage said wheel, and a cam for engaging said pawl.

In testimony whereof I have signed my name to this specification.

GERMAN VIERA RODRIGUEZ.